United States Patent
Grossman et al.

(10) Patent No.: US 8,026,493 B2
(45) Date of Patent: Sep. 27, 2011

(54) METHOD AND APPARATUS FOR CONTROLLED TRIGGERING OF OXYGEN SCAVENGING COMPOSITIONS UTILIZING A WRAP-AROUND SHADE

(75) Inventors: Greg Grossman, Greenville, SC (US); Jason G. Verrett, Simpsonville, SC (US); Stephen F. Compton, Spartanburg, SC (US); Scott W. Beckwith, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 1736 days.

(21) Appl. No.: 11/258,802

(22) Filed: Oct. 26, 2005

(65) Prior Publication Data
US 2007/0092832 A1    Apr. 26, 2007

(51) Int. Cl.
*B01J 19/08*    (2006.01)
(52) U.S. Cl. ......... 250/453.11; 250/454.11; 250/455.11; 250/504 R; 422/186; 422/186.03; 422/186.05; 252/188.28; 426/240
(58) Field of Classification Search .............. 250/504 R, 250/453.11, 454.11, 455.11; 422/186, 186.03, 422/186.05; 252/188.28; 426/240
See application file for complete search history.

(56) References Cited

U.S. PATENT DOCUMENTS

| | | | |
|---|---|---|---|
| 4,121,107 A | 10/1978 | Bachmann | |
| 4,871,559 A | 10/1989 | Dunn et al. | |
| 4,959,044 A | 9/1990 | Smith et al. | |
| 5,211,875 A | 5/1993 | Speer et al. | |
| 5,350,622 A | 9/1994 | Speer et al. | |
| 5,399,289 A | 3/1995 | Speer et al. | |
| 5,498,364 A | 3/1996 | Speer et al. | |
| 5,788,940 A | 8/1998 | Cicha et al. | |
| 5,811,027 A | 9/1998 | Speer et al. | |
| 5,859,145 A | 1/1999 | Ching et al. | |
| 5,904,960 A * | 5/1999 | Becraft et al. | 427/558 |
| 5,911,910 A * | 6/1999 | Becraft et al. | 252/188.28 |
| 5,958,254 A | 9/1999 | Rooney | |
| 6,214,254 B1 | 4/2001 | Gauthier et al. | |
| 6,233,907 B1 | 5/2001 | Cook, Jr. et al. | |
| 6,255,248 B1 | 7/2001 | Bansleben et al. | |

(Continued)

FOREIGN PATENT DOCUMENTS

EP    1 598 391    11/2005

(Continued)

OTHER PUBLICATIONS

Search Report for EP 06021760.1 dated Jan. 26, 2007.

(Continued)

*Primary Examiner* — David A Vanore
(74) *Attorney, Agent, or Firm* — Alston & Bird LLP (57) ABSTRACT

An apparatus is provided for activating an oxygen scavenging composition that includes a plurality of UV lamps arranged in a bank and disposed in a UV chamber; the UV lamps include first and second sides through which UV light is transmittable. A series of guide rolls disposed in the UV chamber define a film pathway for directing a film in close proximity with the first and second sides of the UV lamps. The UV shade is arranged to wrap about the first and second sides of the UV lamps, and may be configured to move between an open, partially open, and closed position so that the dosage of UV light to which the film is exposed may be controlled by adjusting the degree to which the shade is open. As a result, the UV shade may limit UV exposure without having to turn off the UV lamps.

28 Claims, 5 Drawing Sheets

U.S. PATENT DOCUMENTS

| | | | |
|---|---|---|---|
| 6,259,107 B1 * | 7/2001 | Becraft et al. | 250/504 R |
| 6,287,481 B1 * | 9/2001 | Luthra et al. | 252/188.28 |
| 6,437,850 B2 * | 8/2002 | Vernackt et al. | 355/26 |
| 6,449,923 B1 | 9/2002 | Cook, Jr. et al. | |
| 6,596,203 B1 | 7/2003 | Au et al. | |
| 6,599,487 B1 * | 7/2003 | Luthra et al. | 422/186.3 |
| 6,632,408 B1 * | 10/2003 | Luthra et al. | 422/186.3 |
| 6,720,566 B2 | 4/2004 | Blandford | |
| 6,758,255 B2 | 7/2004 | Sanz et al. | |
| 6,953,940 B2 | 10/2005 | Leighley et al. | |
| 7,638,780 B2 * | 12/2009 | Kilburn et al. | 250/492.1 |
| 7,642,527 B2 * | 1/2010 | Marson et al. | 250/492.1 |
| 7,807,111 B2 * | 10/2010 | Speer et al. | 422/186 |
| 2005/0258378 A1 | 11/2005 | Speer et al. | |

FOREIGN PATENT DOCUMENTS

| | | |
|---|---|---|
| JP | 62-109738 | 7/1987 |
| JP | 62-229833 | 10/1987 |
| JP | 1-52413 | 11/1989 |
| JP | 02-214570 | 8/1990 |
| JP | 2001-520947 | 5/1999 |
| JP | 2000-327191 | 11/2000 |
| JP | 2002-292825 | 10/2002 |
| WO | WO 95/02616 | 1/1995 |
| WO | WO 95/04776 | 2/1995 |
| WO | WO 98/05555 | 2/1998 |
| WO | WO 98/05703 | 2/1998 |
| WO | WO 98/17535 | 4/1998 |
| WO | WO 99/48963 | 9/1999 |
| WO | WO 03/010226 | 2/2003 |
| WO | WO 2004/035417 | 4/2004 |

OTHER PUBLICATIONS

Dunn et al., "Pulsed-Light Treatment of Food and Packaging," *Food Technology*, Sep. 1997, pp. 95-98.

U.S. Appl. No. 11/007,821, filed Dec. 8, 2004, Sperry et al.

\* cited by examiner

METHOD AND APPARATUS FOR CONTROLLED TRIGGERING OF OXYGEN SCAVENGING COMPOSITIONS UTILIZING A WRAP-AROUND SHADE

FIELD OF THE INVENTION

The invention relates generally to articles that are used in packaging oxygen sensitive materials, and more particularly to the triggering of an oxygen scavenging composition.

BACKGROUND OF THE INVENTION

Reducing the exposure to oxygen of oxygen sensitive articles maintains and enhances the quality and shelf life of the article. For instance, reducing the oxygen exposure of oxygen sensitive food products in a packaging system maintains the quality of the food product and avoids food spoilage. Reduced oxygen exposure keeps the product in inventory longer, thereby reducing costs incurred from waste and having to restock.

One method of reducing oxygen exposure is to incorporate an oxygen scavenger into the packaging structure. Oxygen scavenging compositions are compositions that consume, deplete, or reduce the amount of oxygen in a given environment. There are a wide variety of different compositions that can be used in oxygen scavenging applications. Exemplary compositions are described in U.S. Pat. Nos. 5,211,875; 5,350,622; 5,399,289; and 5,811,027 to Speer et al. and WO 99/48963 to Cai et al., all incorporated by reference in their entirety. The oxygen scavenging composition can comprise a substituted or unsubstituted ethylenically unsaturated composition that is capable of scavenging oxygen upon activation or triggering. The oxygen scavenging composition can also include a metal catalyst and photoinitiators that help activate oxygen scavenging, and can be "triggered" by exposing the composition to a radiation source, such as actinic radiation, having sufficient power for a sufficient amount of time to initiate oxygen scavenging. High temperatures can also help trigger the oxygen scavenging composition.

Methods of triggering oxygen scavenging compositions typically use low-pressure mercury germicidal lamps that have an intensity output from about 5 to 10 mW/cm$^2$. These lamps are commonly referred to as germicidal since the principal emission is at 254 nm. During UV light exposure, the compositions can also be heated to further enhance triggering. Heating the composition makes it possible to trigger the oxygen scavenging composition at a lower UV dose. Equipment systems and methods for triggering oxygen scavenging films and articles are disclosed in U.S. Pat. Nos. 6,287,481 to Luthra et al., 6,449,923 to Cook et al., 6,233,907 to Cook et al., and 5,911,910 to Becraft et al., as well as copending U.S. patent application Ser. No. 11/007,821 filed Dec. 8, 2004 directed to high speed triggering systems, all of these incorporated herein in their entirety.

In some circumstances, it may be desirable to limit or prevent an oxygen scavenging composition from further exposure or from being exposed to UV light. Current methods and equipment may rely on turning off the lamps to prevent or limit UV exposure. However, many germicidal lamps may be sensitive to being turned on and off. In some cases, increased on/off cycles may result in significantly shorter lamp life. Accordingly, there exists a need for limiting the amount of light to which an oxygen scavenging composition may be exposed that helps reduce the need to turn on and off the UV lamps.

BRIEF SUMMARY OF THE INVENTION

The invention provides an apparatus and method for activating an oxygen scavenging composition that may help control the amount of UV light to which an oxygen scavenging composition may be exposed. In one embodiment, the invention may be directed to an apparatus for activating a film having an oxygen scavenging composition that includes a UV shade that is capable of being at least partially disposed between the film and one or more UV lamps. The UV shade may comprise a UV opaque material that is capable of substantially preventing UV light from contacting the film. As a result, the UV shade may be used to limit UV exposure without having to turn-off the UV lamps.

In one embodiment, the apparatus may comprise a plurality of UV lamps arranged in a bank and disposed in a UV chamber, and wherein the bank of UV lamps include a first and second sides through which UV light is transmittable. The apparatus may also include a series of guide rolls disposed in the UV chamber that define a film pathway for directing the film in close proximity with the first and second sides of the bank of UV lamps. The apparatus may also include a retractable and extendable UV shade that is structured and arranged to wrap about the first and second sides of the UV lamps. In one embodiment, the UV shade may be configured to move between an open, partially open, and closed position so that the dosage of UV light to which the film is exposed may be controlled by adjusting the degree to which the shade is open.

In another embodiment, the apparatus may also include a shade drive mechanism that is capable of moving the UV shade between varying degrees of openness. In one embodiment, the shade drive mechanism includes at least one endless belt to which an edge of the UV shade is attached and which is operable to wrap the shade about the first and second sides of the UV lamps and thereby control the amount of UV light that is permitted to contact the film. In yet another embodiment, the UV shade may be configured to move between an open and closed position in a path that substantially parallels the film pathway about the first and second sides of the UV lamps, and at a rate of speed that approximates a speed at which the film is traveling through the UV chamber. As a result, the UV shade may be used to prevent UV light from contacting unactivated film while at the same time permitting continued activation of oxygen scavenging compositions in the process of being activated. In one embodiment, the UV shade may be moved into a closed position when substantially all of the activated film has exited the UV chamber. The apparatus may also include a driven roll that is configured for driving the film through the UV chamber. The UV dosage to which the film is exposed may also be controlled by controlling the rate of speed at which the film travels through the UV chamber.

In one embodiment, the apparatus is included in a system for activating an oxygen scavenging composition. The system may include an inventory section that is capable of uptaking any activated film disposed in the UV chamber. In some embodiments, the inventory system may be used in conjunction with the UV shade and a driven roll to limit the amount of light to which an oxygen scavenging composition may be exposed. In one embodiment, the UV shade may be moved into a closed position in response to a predetermined event, such as a stoppage of forward travel of the film. In other embodiments, the predetermined event may be a stoppage in packaging operations that may occur downstream of the UV chamber.

In response to a stoppage or other event, the UV shade may be moved into a closed position at a rate of speed that approximates the speed at which the film is traveling through the UV chamber. As the shade is moved into a closed position, unactivated film entering the UV chamber is prevented from being exposed to UV light. Film already in the UV chamber and in the process of being activated is not screened by the UV shade and is permitted to be exposed to UV light as it travels through the UV chamber so that it may be activated before exiting the UV chamber. The UV shade may be disposed in the closed position when substantially all the activated film has exited the UV chamber. Forward motion of the film may be stopped at this time. In some embodiments, the activated film exiting the UV chamber may be temporarily stored in an inventory system.

In yet another embodiment, the system and apparatus may include a control unit, such as a programmable logic controller, that may be operatively connected to the UV shade and the driven roll. In other embodiments, the control unit may also be configured to control the operations of the inventory system. The control unit may in one embodiment be able to control the amount of UV dosage to which an oxygen scavenging composition may be exposed by controlling the amount of UV light which is permitted to contact the composition and controlling the rate of speed at which the web travels through the UV chamber.

Thus, the invention provides an apparatus and method for controlling the amount of UV dosage to which an oxygen scavenging composition may be exposed and that may be used to substantially prevent UV light from contacting an oxygen scavenging composition without having to turn off the UV lamps.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
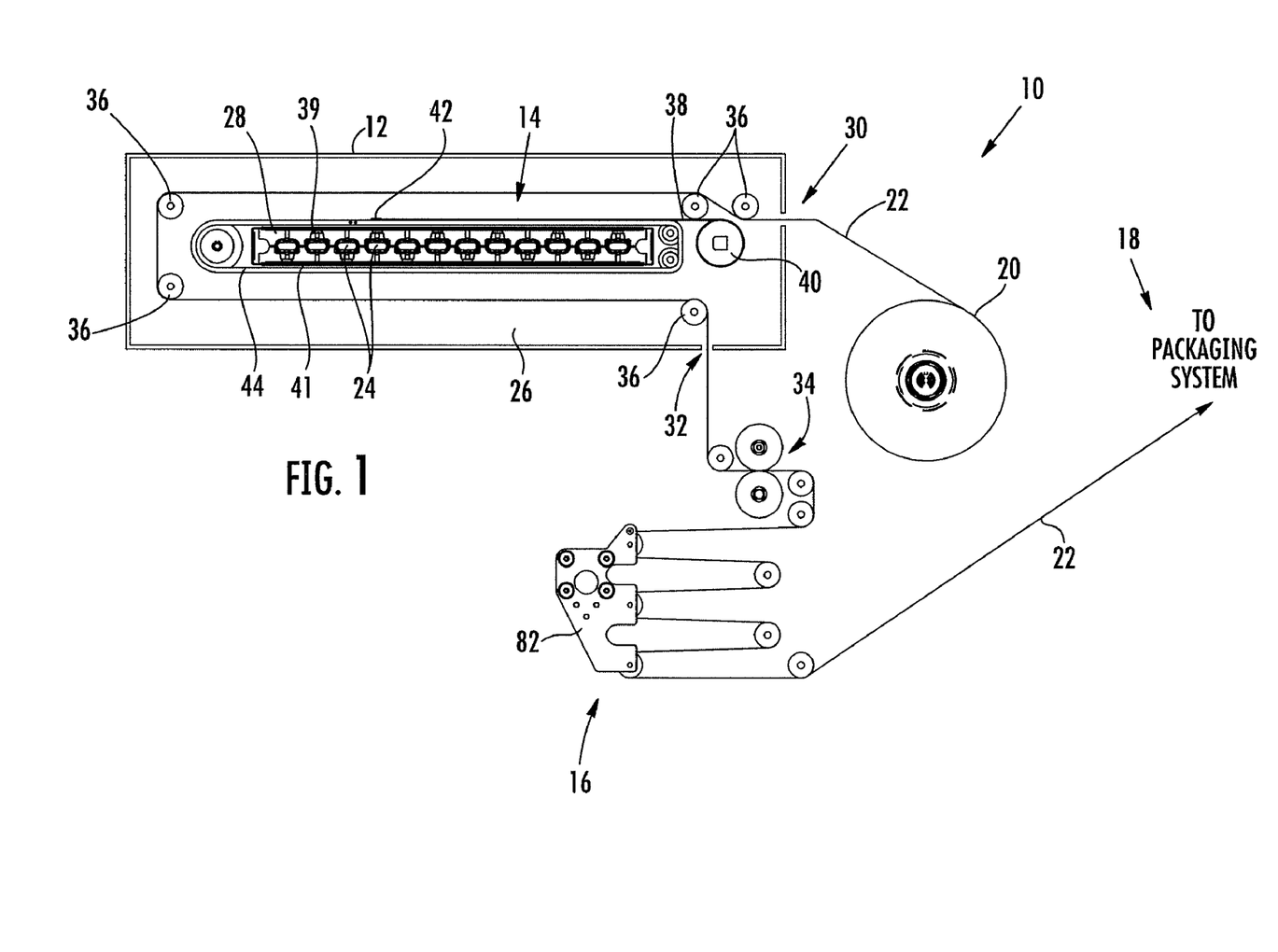
FIG. 1 is a cross-sectional side view of a system for activating an oxygen scavenging system wherein the system includes a UV shade that is capable of being disposed between a film and a UV light source.

With reference to FIG. 1, a system for activating an oxygen scavenging composition is illustrated and broadly designated by reference number 10. As shown in FIG. 1, the system may include a UV chamber 12 for activating an oxygen scavenging composition. The UV chamber includes a UV light source 14 that emits UV light having sufficient power to activate an oxygen scavenging composition. In some embodiments, the oxygen scavenging composition may be disposed in a flexible material, such as a film, that travels through the UV chamber and is exposed to a UV light source of sufficient intensity and for a residence time sufficient to activate the oxygen scavenging composition. It should be recognized that the term "film" as used herein refers to a variety of different flexible materials that can be used in conjunction with the UV chamber including without limitation, a laminate, a web, a sheet, a coating on a substrate or carrier, and the like. In one embodiment, the invention may be particularly useful for activating oxygen scavenging compositions that can be used in packaging articles. Examples include a film that can be used as a component in a rigid, semi-rigid, or flexible product; a film that can be used as a coupon or insert within a package; a film that can be included on, in, or as a part of an oxygen barrier film; or a film that has a relatively high rate of oxygen transmission.

In one embodiment, the system may include an inventory section 16 for temporarily accumulating activated film, and a packaging system 18 for packaging product or storage. In some embodiments, a film having an unactivated oxygen scavenging composition can be supplied from a continuous roll 20 of film. In one embodiment, the film 22 may enter the UV chamber 12 and be exposed to a UV light source of sufficient intensity and for a residence time sufficient to activate the oxygen scavenging composition. It should be noted that the system of the invention can be used in a packaging environment, e.g., in a facility in which the film is both activated as described herein, and then advanced to a packaging system 18 wherein the activated film is used to package an article such as an oxygen sensitive product. Alternatively, the system can be used to activate a film as described herein at a film manufacturing location or at a location wherein the film is processed as described herein, and the film then stored and transported to a location wherein the packaging of articles is performed. Thus, the system and method of the invention can be performed independently of a packaging operation. Steps can be taken to substantially preserve the oxygen scavenging functionality of the activated film until it is used for packaging applications. One method for doing this is disclosed in U.S. Pat. No. 6,942,821 to Dayrit et al., incorporated by reference herein in its entirety.

The UV chamber 12, also referred to as a triggering chamber, may include one or more UV lamps 24 that are disposed in an interior space 26 of the UV chamber. In one embodiment, the UV lamp(s) may be disposed in a lamp bank 28 in which the UV lamps may be spaced apart and substantially parallel to each other. In other embodiments, the UV lamp(s) may be arranged in other orientations, such as a non-linear arrangement. In some embodiments, the UV chamber may include two or more UV lamp banks. In some embodiments, the UV lamp bank may include a plurality of UV lamps that are substantially parallel to each other and can be arranged in a side-by-side manner to allow optimal exposure to the film. The lamp bank in some embodiments may have from about 5 to 20 UV lamps. The lamp bank can have a wide variety of structures and forms. The distance between the film and the UV lamps may be from about 1 to 8 cm, such as about 4 cm.

Lamps that are useful in the invention have output intensities at 254 nm that are typically from about 10 to 35 mW/cm$^2$ measured at a distance of 2 inches from the lamp surface, and at air temperatures of about 160° F. Suitable values for output intensity are from about 15 to 35 mW/cm$^2$. UV-C light such as UV light of germicidal wavelengths has been found effective at triggering certain oxygen scavenging compositions. Useful wavelengths are e.g., between 200 nm and 280 nm, such as 254 nm. In some embodiments, the UV lamp(s) may comprise mercury amalgam lamps. Low-pressure mercury amalgam lamps are germicidal lamps that produce their highest output at wavelengths that are between 200 to 280 nm. Within this region, the lamps can produce intensities that exceed 20 mW/cm$^2$. Typically, mercury amalgam lamps may have intensities at 254 nm that are from about 15 to 35 mW/cm$^2$.

As shown in FIG. 1, the triggering chamber 12 may include an inlet 30 and outlet 32 that define openings or slits in the chamber through which the film can enter or exit the chamber. The film may be driven forward through the chamber 12 with a driven roll 34, or any other suitable means for advancing the film. The speed of the driven roll may also be adjusted to help control the UV dosage to which the film is exposed. The driven roll can be selected from a wide variety of rolls, such as nip rolls, that can be used to drive the film in a desired direction. The driven roll can be powered with a motorized device, such as an electric or pneumatic motor. In the embodiment illustrated in FIG. 1, the triggering chamber includes a driven roll disposed adjacent to the outlet 32. The driven roll can alternatively be disposed within the chamber adjacent to the inlet or outlet. It should be recognized that the exact placement of the driven roll 34 is not critical to the practice of the invention and that the roll may be placed at other locations within the chamber or outside of the chamber provided that the driven roll can maintain a desired level of tension and forward motion on the film at a desired rate of speed. In some embodiments, the triggering chamber may include two or more driven rolls. In one embodiment, the UV chamber may include a first driven roll that drives the film forward into the UV chamber and a second driven roll that may be used to drive the film outwardly from within the chamber. In embodiments having two or more driven rolls, the speed of driven rolls can be adjusted to increase or decrease film tension. Alternatively, in embodiments of systems of the invention that feed the activated film to a downstream packaging system, the means that advance the activated film within the package system can be used to draw unactivated film through the chamber that includes the UV shade system, and then out of the chamber and into the packaging system.

In one embodiment, the driven roll 34 may also help maintain the film at a desired level of tension. Maintaining the film at a desired level of tension within the triggering chamber helps reduce or eliminate film curl or wrinkles that can occur at higher temperatures. The film should be maintained at a tension that is sufficient to maintain film control and overcome the tendency of the film to curl or wrinkle at higher temperatures. In some embodiments, web or film tension in the chamber is maintained from about 0 to 2.5 pounds per linear inch of film width (PLI). Somewhat more typical, is a tension that is slightly greater than 0 PLI and that is less than 2.5 PLI, for example 0.25 to 1.0 PLI. Excessive tension could result in elongation of the film accompanied by a decrease in the width of the film.

The triggering chamber may include a series of guide rolls 36 that direct and guide the film 22 in close proximity to the UV lamp(s) 24. Upon entering the chamber, the path of the film may be directed and defined by the guide rolls. In some embodiments, the UV lamp(s) may be arranged in the chamber to include a first side 40 and second side 41 along which the film may be directed. In this regard, FIG. 1 illustrates a plurality of guide rolls defining a film pathway in close proximity with the first and second sides of the UV lamp(s). In one embodiment, the film may be directed along a film pathway in close proximity to a first side of the UV lamp(s) and then wrap around from the first side to the second side of the UV lamp (s). The guide rolls 36 may direct the film into close proximity with the UV lamp(s). Travel of the film in close proximity to the first and second sides of the UV lamp(s) may be used to activate the oxygen scavenging composition. In this embodiment, the distance between the film and the first side of the UV lamp(s) can be the same as, or different from, the distance between the film and the second side of the UV lamp(s).

In one embodiment, the triggering chamber may also include a dose management system that is capable of controlling the amount of UV dosage to which the film may be exposed. In one embodiment, the dose management system may comprise a UV shade 38 that is capable of being positioned between the film pathway and the UV lamp(s). In some embodiments, the UV shade may be moveable between an open position, a partially open position, and a closed position. As a result, the amount of UV dosage to which the film may be exposed may be controllable by adjusting the degree to which the shade is open.

As discussed in greater detail below, the triggering chamber may include a shade drive system that is operable to move the UV shade between an open, partially open, and a closed position. The shade drive system may comprise a shade roll 40 from which the UV shade is extendable and/or retractable. In one embodiment, the UV shade may include a leading edge 42 that is attached to at least one endless belt 44 that wraps about the first and second sides of the UV lamp(s). The endless belt may be in mechanical communication with a motor (see briefly FIG. 2, reference number 50) that is operable to drive the endless belt about the UV lamp(s). In one embodiment, driving the endless belt about the UV lamp(s) causes the UV shade to be extended out of, or retracted into, the shade roll 40. In another embodiment, the endless belt may be used to wrap the UV shade from the first to second side of the UV lamp(s).

In one embodiment, UV light may be substantially prevented from contacting the film by moving the UV shade into a closed position. By "closed position" is meant the position in which the UV shade 38 has been extended out of the shade roll 40 to the extent that UV light from the UV lamp(s) 24 is prevented from reaching the film 22. Preventing UV light from contacting the film may help prevent unactivated film from being activated. In some embodiments, the UV shade may be used to prevent unactivated film disposed in the UV chamber or in the process of entering the UV triggering chamber from being activated without having to turn off the UV lamp(s). As discussed above, some UV lamps may be adversely affected by being turned off and on. Current methods and equipment may rely on turning off the lamps to prevent overexposure of the film; however, increased on/off cycles can result in significantly shorter lamp life. It is therefore desirable to have a dose management system that does not require additional on/off cycles for the lamps. Additionally, closure of the UV shade may permit the film to travel within the triggering chamber without UV exposure. Thus, UV exposure can be eliminated or substantially prevented without having to turn off the lamps. This can be particularly useful when using mercury amalgam lamps. Typically, amalgam lamps have a longer warm up time than standard lamps from a cold start, and may be even more detrimentally affected by on/off cycles than standard germicidal lamps.

As described above, the UV shade can move between a relatively open position to closed position and vice versa. As a result, the UV shade can change positions (degree of extension from the shade roll 40) so that the amount of UV exposure that the film receives can be varied. This feature is particularly useful for activating oxygen scavenging films across a range of packaging speeds, including conditions where the packaging speed may routinely vary or be somewhat intermittent. For example, it may be common for an operator to start up a packaging line at a low speed until all parameters are operating correctly and then ramp up to higher speeds. Under these conditions a constant UV dose and consistent oxygen scavenging can be maintained with the triggering chamber. In addition, a wide variety of films having differing oxygen scavenging compositions, or a given film intended for differing end use applications can be activated by the triggering chamber. For instance, if a lower scavenging rate is desired, the UV shade can be repositioned to decrease the amount of UV light contacting the film. If a faster scavenging rate is desired, the UV shade can be repositioned to permit a greater amount of UV light to contact the film. Thus, the dose management system can also be used to control the amount of UV exposure that the film receives.

Figure 2:
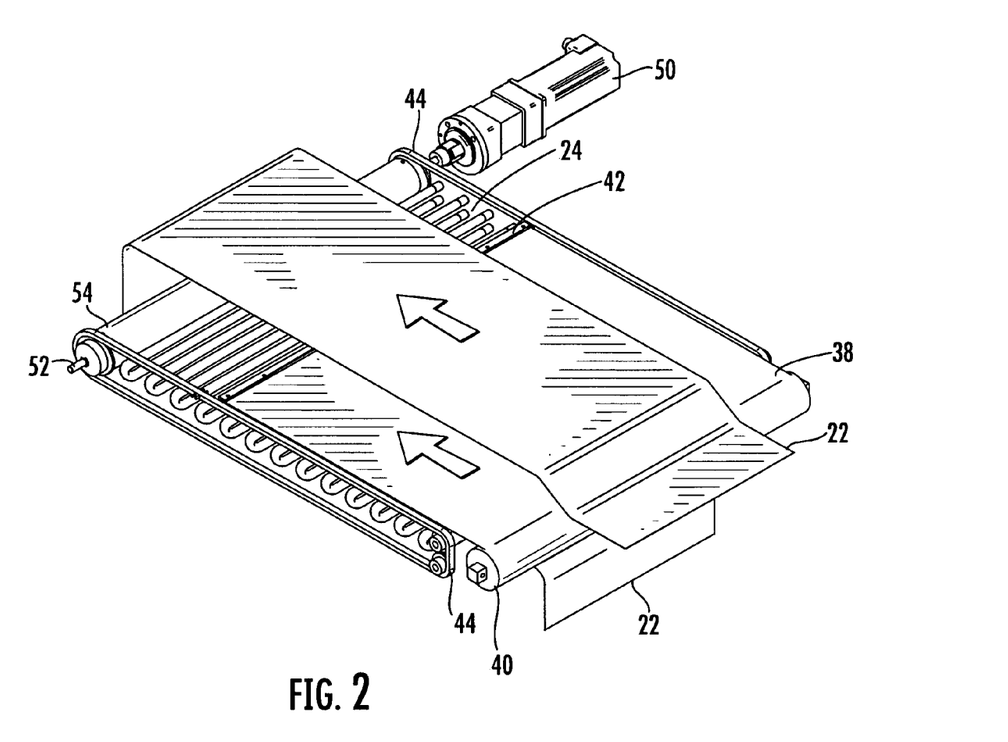
FIG. 2 is a perspective view of a UV shade that is capable of being disposed between a film and a plurality of UV lamps, and a shade drive device.

In one embodiment, the UV shade may be capable of being at least partially disposed between the UV lamps and the film. In this regard, FIG. 2 illustrates an embodiment, wherein a UV lamp shade is depicted as being partially disposed between a plurality of UV lamps and a film having an oxygen scavenging composition. As discussed above, the triggering unit may include a UV dose management system comprising a UV shade that is in mechanical communication with a shade drive system that is operable for moving the UV shade between varying degrees of openness. As shown, the shade drive system may comprise two endless belts 44 to which a leading edge 42 of the UV shade 38 may be attached. In one embodiment, a motor 50 may be in mechanical communication with drive shaft 52, which may include a pair of pulleys that drive the endless belts 44 about the plurality of UV lamps 24. In some embodiments, an idler roll 54 may be rotatably disposed about drive shaft 52. In one embodiment, idler roll 54 provides a surface over which the UV shade may travel as the UV shade wraps about the plurality of UV lamps and moves between open and closed positions. Rotation of drive shaft 52 may cause rotation of endless belts 44 about the first and second sides of the plurality of UV lamps. Rotation of the endless belts 44 causes the UV shade to be extended or retracted from UV shade roll 40. In some embodiments, the UV shade can be disposed on a roll 40 that can be under spring tension so that when released, the UV shade can automatically recoil, thereby opening the shade and exposing the UV lamps. The UV shade roll 40 may include a winding mechanism and may also include a wind-up shaft (not illustrated) that may be connected to the roll 40. The wind-up shaft can be actuated to wind the UV shade onto the roll and thereby open the shade. The winding mechanism and wind-up shaft can be manually or automatically adjusted to provide a desired level of UV exposure.

In another embodiment, the UV shade may wrap about the first and second sides of the plurality of UV lamps along a pathway that is substantially parallel to the path of the film as it travels through the triggering chamber. In one embodiment, the direction in which the UV shade moves from an open to closed position may be substantially the same as the direction of the film as it travels in close proximity to the plurality of UV lamps. In this regard, FIG. 2 illustrates an embodiment wherein the path of the UV shade is substantially parallel to the path of the film as it travels in close proximity to the plurality of UV lamps. FIG. 2 also illustrates a UV shade moving from an open position to a closed position in a direction that is substantially the same as the direction of the film as the film is traveling in close proximity to the plurality of UV lamps. As discussed in greater detail below, the dose management system may also be used in conjunction with a control unit that can be programmed to provide a consistent UV dose to the film across a wide range of packaging speeds, and can eliminate the need to switch the lamps off to prevent overexposure.

Figure 3:
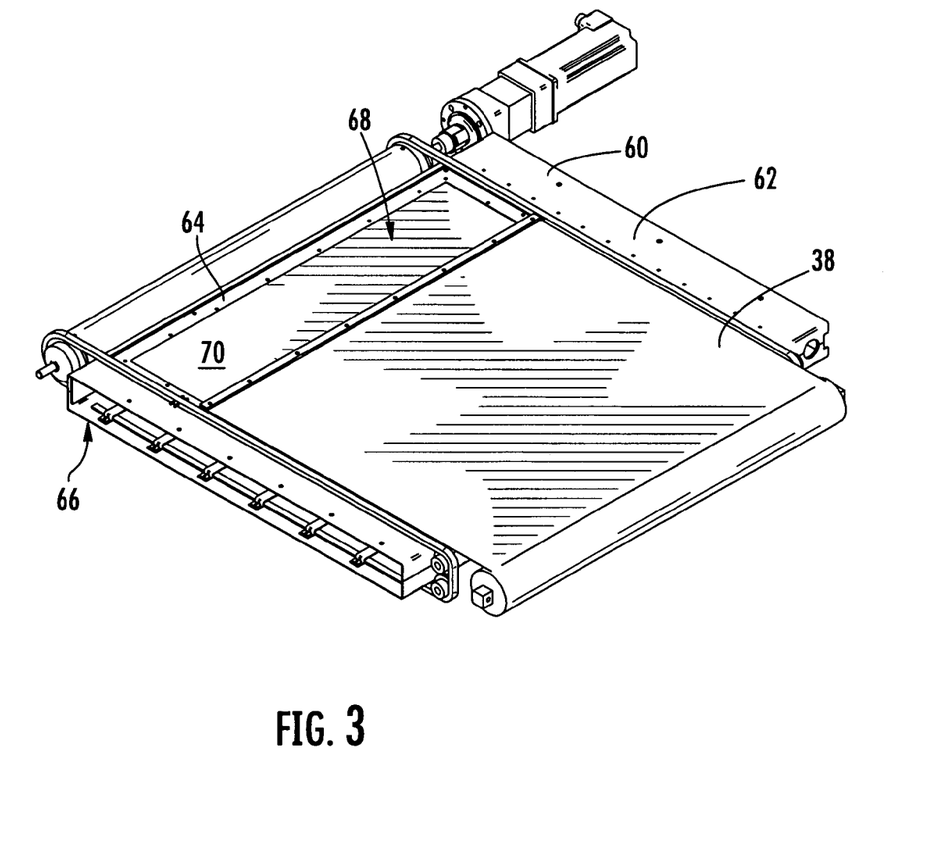
FIG. 3 is a perspective view of a cassette that is configured to hold a plurality of UV lamps and wherein the UV shade is in a partially open position.
Figure 4:
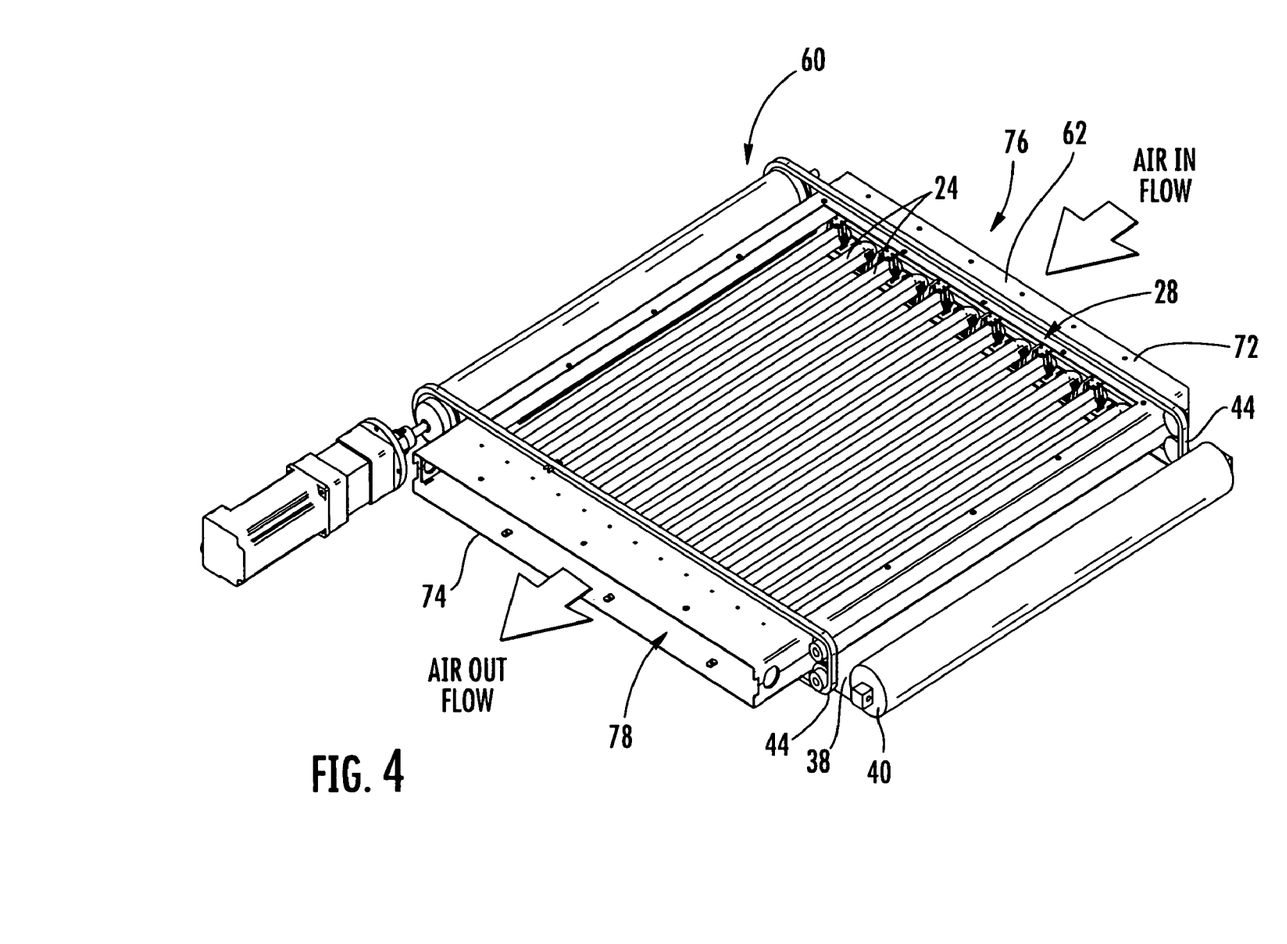
FIG. 4 is a perspective of the cassette of FIG. 3 wherein a panel of the cassette has been removed.

In one embodiment, the plurality of UV lamps may comprise a lamp bank in the form of an enclosed cassette having a pair of dual windows through which UV light can be transmitted. In this regard, FIGS. 3 and 4 illustrate an embodiment wherein a plurality of UV lamps are disposed in a cassette. As shown in FIG. 3, the UV cassette 60 may comprise a cassette housing 62 having a plurality of UV lamps located therein. The cassette housing can comprise a first panel 64 and second panel 66, which together form an enclosed spaced in which the UV lamps are disposed. Typically, both panels 64, 66 have an opening or window 68 through which UV light is transmittable. The opening 68 can be covered with a thin pane 70 through which UV light can be transmitted. In some embodiments, the window pane may serve several functions. In one embodiment, the window pane may enclose the UV lamps so that in the event of breakage, production contamination is limited, i.e., shattered quartz is prevented from contacting the film. The window pane may also enclose the cassette so that a controlled airflow can be introduced across the surface of the UV lamps with an air circulation system. The window pane 70 may comprise a UV transparent material, such as quartz or a thin sheet of a fluorocarbon polymer such as FEP-Teflon®. In one embodiment the window pane 70 may be from about 1 to 7 mils thick. In other embodiments, the UV lamps may include an outer sleeve (not shown) that can protect the film from debris in the event of lamp breakage. The sleeve can be a shrinkable member or coating that can be applied to the lamps. One type of sleeve comprises FEP-Teflon® that may be heat shrunk around the lamp.

The UV shade can be constructed of a variety of materials that are UV opaque and substantially prevent UV light from being transmitted from the UV lamps through the openings 68. The UVshade in some embodiments may be constructed of a thin flexible material such as a foil. Suitable materials include, but are not limited to, stainless steel, aluminum, metallic alloys, UV opaque plastic films, metalized plastic films, KAPTON® polyimide film, Teflon® impregnated glass cloth, and the like.

In FIG. 4, an outer panel of the cassette housing has been removed. As shown, the UV lamps 24 may comprise a lamp bank 28 wherein the UV lamps are arranged in a row and are substantially parallel to one another. In some embodiments, the opposing edges 72, 74 of the cassette housing 62 may include an inlet 76 and an outlet 78 through which air may be introduced across the surface of the UV lamps. UV lamps may produce heat at temperatures exceeding about 120° F. In some embodiments, the triggering chamber may include an air circulation system that helps to maintain the UV lamps at a desired temperature. In this regard, FIG. 4 illustrates conditioning air entering the cassette housing via inlet 76 and exiting the cassette via outlet 78. In some embodiments the air exiting the cassette could be recirculated through a heat exchange and blower. In other embodiments, the air exiting the cassette could be discharged into the triggering chamber. The lamp air circulation system may comprise a fan or blower, a heat exchanger, and a plenum. Heated air can be removed from within the triggering chamber by the fan and directed into a heat exchanger. At the heat exchanger, the air is conditioned, such as cooled or heated, and then directed into the plenum where it is subsequently directed into contact with the UV lamps 24 via inlet 76. The arrows represent airflow through the cassette housing.

Figure 5:
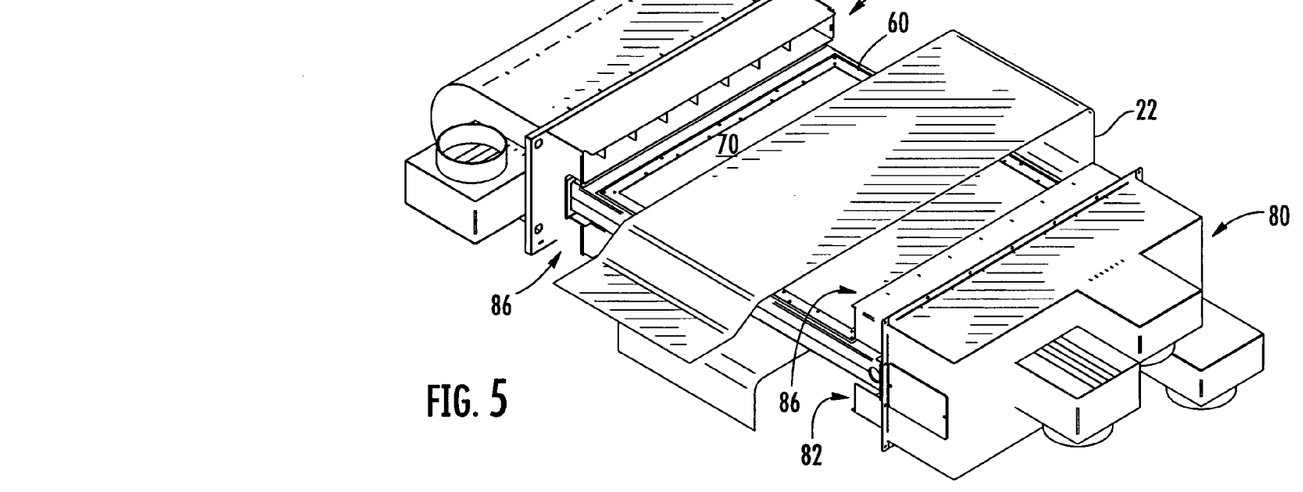
FIG. 5 is a perspective view of an air circulation system that can be used to introduce conditioned air across the film and wherein a portion of the UV chamber has been removed for visualization.
Figure 6:
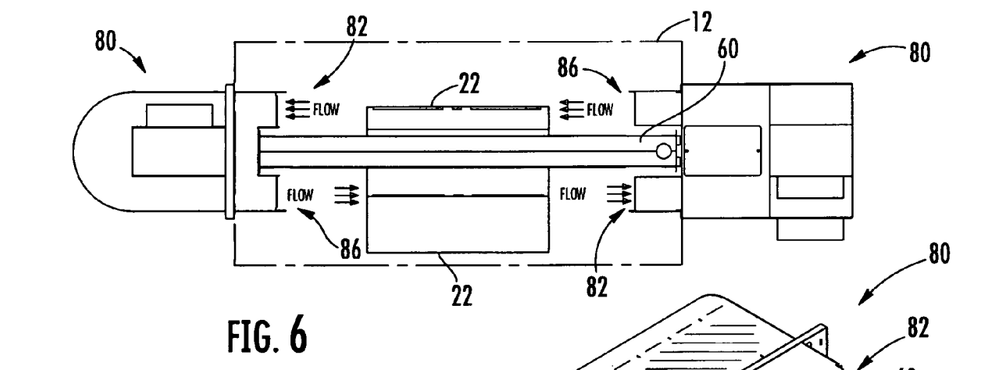
FIG. 6 is a cross-sectional side perspective of the air circulation system of FIG. 5 depicting conditioned air being introduced across the film.

The triggering chamber may also include a separate air handling system for maintaining the film at a desired temperature. Many UV lamps produce both UV-C light and heat. The infrared energy from the lamps can be used to heat the film to temperatures that can range from about 100 to 160° F. In some embodiments, the film may be heated to temperatures that are greater than 120° F. In one embodiment, the film may be heated to temperatures from about 140 to 160° F. An air circulation system can be used to help prevent the film from exceeding desired temperatures. The air circulation system may also be used to heat the film to a desired temperature. In this regard, FIGS. 5 and 6 illustrate an air handling system 80 that may be used to control the temperature of the film. FIG. 5 is a perspective view illustrating the air handling system that is configured to remove heated air from, or introduce heated air into, the triggering chamber and introduce conditioned air across the film. FIG. 6 is cross-sectional side view depicting conditioned air being introduced across the film pathway and being removed from within the triggering chamber. In some embodiments, the air handling system may comprise an air circulation system that can be used to keep the film and the lamps at a desired temperature. The air circulation system 80 may includes an air intake 82, a heat exchanger (not shown), a fan or blower (not shown), and a plenum 86. The fan or blower draws heated air from within the triggering chamber. The heated air is drawn into the intake 82 where it subsequently passed through a heat exchanger. The heat exchanger can be used to condition the air. The air is then directed by fan through a plenum 86 that directs the now conditioned air into contact with the film 22. As a result, the temperature of the film 22 can be maintained at a desired temperature so that triggering is enhanced without damaging or curling the film. The chamber can be operated at a slight negative pressure. Although not illustrated, a vent could be located within the air circulation system 80 that could be used to vent some of the air outside the chamber. The triggering chamber could also include an optional infrared heater (not shown) to heat the film before it enters the UV chamber.

In some embodiments the triggering chamber may be operatively connected to a control unit, such as a programmable logic controller. The control unit can be used to operatively control film tension, film speed, UV dosage, temperature, and the like. Typically, the control unit may be in communication with the driven roll (see briefly FIG. 1, reference number 34) and the shade drive system. The control unit may be able to control the UV dosage to which a film may be exposed by controlling the rate at which the film travels through the triggering chamber and/or the amount of UV light that is permitted to contact the film. The control unit may also be operatively connected to one or more air circulation systems and various sensors disposed within the triggering system. The control unit can be used to monitor and control film speed and UV dosage. The control unit can be programmed or automated to maintain a desired level of UV dosage to which the film may be exposed. In one embodiment, the control unit may be configured to move the UV shade into a substantially closed position in response to a predetermined event, such as a stoppage of the forward movement of film travel.

Referring back to FIG. 1, the triggering system 10 may also include a film inventory system that can be used to temporarily store film contained in the triggering chamber. In one embodiment, activated film 22 exiting the triggering chamber 12 may travel through an inventory section 16 before proceeding to a packaging system or wind-up roll. The capacity of the inventory section may be expandable so that in the event of a production line stoppage, the inventory section can temporarily store any activated film that is contained within the triggering chamber. After passing through the inventory section the film may travel to a packaging device or wind-up roll where it can be stored for later use. In some embodiments, the capacity of the inventory section may be as great as or greater than the film capacity within the interior of the triggering chamber. The inventory section 16 may include a moveable inventory shuttle 82 that can be moved into various positions so that the inventory section can be expanded to temporarily store any excess film that may be present in the triggering chamber. The inventory shuttle 82 can be repositioned to expand or decrease capacity of the inventory section. In the event of a line stoppage, such as a stoppage or delay that occurs at the packaging system, the inventory shuttle can be repositioned to uptake any film disposed in the triggering chamber. As a result, film UV exposure can be stopped without having to turn off the UV lamps. In one embodiment, the inventory section can uptake and store activated film that is disposed within the UV chamber.

After the activated film 22 has exited the triggering chamber it can be sent to a wind-up roll or other suitable storage means for later use, or it can be sent to a packaging system 18 for immediate use.

In some embodiment, the UV shade and the driven roll may work in cooperation to control and limit the amount of UV dosage to which a film may be exposed. In one embodiment, the UV shade and driven roll may be used concomitantly to limit the UV exposure of film entering the triggering chamber, while permitting activation of film in the process of being activated. For example, in the event of a predetermined event, such as a line stoppage at some point downstream of the triggering chamber, the UV shade can be directed to move into a closed position to prevent further activation of film entering the triggering chamber. In one embodiment, the speed at which the UV shade is moved into the closed position may approximate the speed at which the film is traveling within the triggering chamber. As a result, the UV shade can be directed to move into a closed position so that unactivated film entering the triggering chamber is not exposed to UV light, and film in the process of being activated may continue to receive a sufficient UV dosage to activate the film. As the film is activated, the driven roll may continue to drive it forward out of the triggering chamber. In some embodiments, the driven roll may stop forward movement of the film when the UV shade has been moved into a closed position and substantially all of the activated film has exited the chamber. Thus, the UV shade may permit activated film to be driven out of the triggering chamber and may be used to prevent further activation of unactivated film without having to turn-off the UV lamps.

In some embodiments, activated film exiting the triggering chamber may be temporarily stored in the inventory system. In some embodiments, operation of the UV shade and the driven roll may be operatively controlled by a control unit which is automated to control activation of the film. The control unit may also be operatively connected to the inventory system so that the inventory section may be capable of up taking activated film exiting the triggering chamber.

The triggering system can be used in the packaging of a wide variety of oxygen sensitive products including smoked and processed meats such as sliced turkey, ham, pepperoni and bologna, vegetable products such as tomato based products, jams and jellies, other food products, such baby foods and other products including electronic components, limited lifetime optical storage media, pharmaceuticals, and the like. The triggering chamber is readily adaptable to various vertical form-fill-and-seal (VFFS) and horizontal form-fill-and-seal (HFFS) packaging lines.

A wide variety of oxygen scavenging compositions can be triggered using the invention. Suitable oxygen scavenging compositions are described in U.S. Pat. Nos. 5,211,875, 5,350,622, 5,498,364, and 5,399,289 to Speer et al., and WO 95/04776 and WO 95/02616 to Ching et al., and WO 99/48963 to Cai et al., which are all hereby incorporated by reference in their entirety. Oxygen scavenging compositions for use in the invention may include oxidizable organic compositions that can be combined with a transition metal catalyst, for example as disclosed in U.S. Pat. No. 5,211,875. Oxygen scavenging compositions include, without limitation, oxidizable organic compositions of substituted or unsubstituted ethylenically unsaturated hydrocarbon polymers. Typical polymers that are useful in the invention may have a molecular weight of at least 1000. Particularly useful organic compositions include, but are not limited to styrene/butadiene copolymers, styrene/isoprene copolymers, polybutadiene, polyisoprene, ethylene/methyl acrylate/cyclohexene methyl acrylate, and mixtures thereof. The transition metal catalyst of the oxygen scavenging composition is typically a transition metal salt of cobalt, manganese, nickel, iron, copper, rhodium, ruthenium, or mixtures thereof.

Additional oxygen scavenging compositions that can be used in the invention are disclosed in U.S. Pat. Nos. 5,958,254 to Rooney, 5,859,145 to Ching et al., 6,255,248 to Bansleben et al., 6,214,254 to Gauthier et al, U.S. patent application Ser. No. 10/746,626, filed Dec. 24, 2003, and PCT patent publication WO 99/48963, which are all hereby incorporated by reference in their entirety. Other oxygen scavengers which can be used in connection with this invention are disclosed in U.S. Pat. No. 5,958,254 to Rooney incorporated by reference herein in its entirety. These oxygen scavengers include at least one reducible organic composition which is reduced under predetermined conditions, the reduced form of the composition being oxidizable by molecular oxygen, wherein the reduction and/or subsequent oxidation of the organic composition occurs independent of the presence of a transition metal catalyst. The reducible organic composition is preferably a quinone, a photoreducible dye, or a carbonyl composition which has absorbance in the UV spectrum.

The oxygen scavenging compositions can also include photoinitiators, diluents, and additives such as fillers, pigments, dyestuffs, antioxidants, stabilizers, processing aids, plasticizers, fire retardants, anti-fog agents, etc.

The amount of exposure that is needed to trigger the oxygen scavenging composition is dependent upon several variables such as the temperature of the film during and after triggering, film formulation, lamp intensity, film path length, proximity to the UV source, etc. Typically, the oxygen scavenging compositions can be triggered by exposure to UV-C light at a desired wavelength, intensity, and residence time to provide the composition with a dose of UV-C light of at least about 50 mJ/cm$^2$. For example, the composition can receive a dose in excess of 150 mJ/cm$^2$, such as from 300 to 1000 mJ/cm$^2$. In some cases, the UV dose may be as high as 1600 mJ/cm$^2$.

As previously described, the invention includes a dose management system that can be used to control the amount of UV exposure a particular oxygen scavenging composition receives. For instance, when the triggered article is to be used in packages having a headspace, such as modified atmosphere packages (MAP), a faster oxygen scavenging rate, preferably with a very short induction period, is preferred. With such packages, the preferred doses of UV-C light are between 300 and 1600 mJ/cm$^2$, such as between 400 and 800 mJ/cm$^2$. The induction period refers to the period of time before the scavenging composition exhibits useful scavenging properties. Compositions exhibiting lengthy induction times are typically held by an end user in inventory for a sufficient period of time before use. On the other hand, oxygen scavenging compositions having a shorter induction period are typically used within a relatively short period of time so that the oxygen scavenging properties of the material are not prematurely exhausted.

When the oxygen scavenging film is to be used in active oxygen barrier packaging, the scavenging film provides a function of assisting in preventing the influx of oxygen through the package layers. In an active barrier application, lower oxygen scavenging rates are acceptable and preferred so that the oxygen scavenging film enhances the oxygen barrier nature of the package for longer periods of time. Exemplary active oxygen barrier films that can be used in conjunction with the invention are described in PCT patent publication WO 02/18489 and U.S. Pat. No. 6,599,598 to Kuraray, which are both hereby incorporated by reference in their entirety. Active oxygen barrier films can include one or more layers that provide a physical oxygen barrier and one or more layers that provide active oxygen barrier (scavengers). In some instances, the active oxygen barrier layer may contain a diluent polymer that also provides substantial physical oxygen barrier as well. In some embodiments, the oxygen scavenging formulation may be physically blended into an oxygen barrier layer. For use with barrier packages, especially high barrier long hold packages, the preferred dose of triggering UV-C light is between 50 and 800 mJ/cm$^2$.

It should be apparent from the above discussion that the invention provides a method, apparatus, and system of using the apparatus that can be used to trigger an oxygen scavenging composition at higher speeds than were previously attainable. The invention also provides a triggering unit that can be used to control UV exposure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A triggering unit for activating a web having an oxygen scavenging composition comprising:
   a UV light source disposed in a UV chamber, the UV light source including at least one UV lamp;
   a series of guide rolls disposed in said UV chamber and defining a web pathway about the UV light source and for directing the web in close proximity with the UV light source; and
   a UV shade disposed between the UV light source and the web pathway, the UV shade capable of at least partially blocking the web from exposure to UV light from the UV light source, the UV shade being arranged to wrap about the UV light source and moveable relative to the UV chamber between open, partially open, and closed positions so as to control the dosage of UV light to which the web is exposed by adjusting the degree to which the UV shade is open.

2. The triggering unit according to claim 1, further comprising a shade drive system operable to move the UV shade from the open position to the closed position along a path that substantially parallels the web pathway.

3. The triggering unit according to claim 2, wherein the UV shade includes a leading edge and the shade drive system is operable to move the UV shade at a speed approximating a rate of speed at which the web is traveling through the UV chamber.

4. The triggering unit according to claim 1, wherein UV light is substantially prevented from contacting a web disposed in the UV chamber when the UV shade is in the closed position.

5. The apparatus according to claim 1, wherein the UV shade is in mechanical communication with a shade drive device that is operable to move the UV shade between varying degrees of openness.

6. The apparatus according to claim 5, wherein the shade drive device includes at least one endless belt that wraps about the first and second sides and is connected to the UV shade, the endless belt being configured to move the UV shade between the open position, the closed position, and any position therebetween.

7. The apparatus according to claim 1, wherein the bank of UV lamps are disposed in a cassette, the cassette including first and second panels between which the bank of UV lamps is disposed, the first and second panels each including an opening through which UV light is transmittable.

8. The apparatus according to claim 7, wherein the cassette includes opposing open side edges through which air is circulatable across a surface of the UV lamps disposed therein.

9. The apparatus according to claim 8, further comprising a lamp conditioning system having
    a fan for removing air from within the cassette;
    a heat exchanger for conditioning the air removed from the cassette; and
    a plenum for passing the thus conditioned air in contact with the UV lamps.

10. An apparatus for activating a web having an oxygen scavenging composition, comprising:
    a plurality of UV lamps arranged in a bank and disposed in a UV chamber, the bank of UV lamps having first and second sides through which UV light is transmittable;
    a series of guide rolls disposed in said UV chamber and defining a web pathway for directing the web in close proximity with the first and second sides of the bank of UV lamps; and
    a retractable and extendable UV shade arranged to wrap about the first and second sides, the UV shade being configured to move between open, partially open, and closed positions so that the dosage of UV light to which the web is exposed is controlled by adjusting the degree to which the shade is open.

11. The apparatus according to claim 10, wherein the apparatus includes two or more banks of UV lamps.

12. The apparatus according to claim 10, wherein the UV shade is configured to move from the open position to the closed position along a path that substantially parallels the web pathway.

13. The apparatus according to claim 12, wherein the UV shade includes a leading edge and wherein the shade drive system is operable to move the UV shade at a speed approximating a rate of speed at which the web is traveling through the UV chamber.

14. The apparatus according to claim 10, further comprising an air circulation system having
    a fan for removing air from the UV chamber;
    a heat exchanger for conditioning the air removed from the UV chamber; and
    a plenum for passing the thus conditioned air over the web as the web moves through the UV chamber.

15. A system for activating a film having an oxygen scavenging composition, the system comprising:
    a roll of unactivated film having an oxygen scavenging composition that is in an unactivated state;
    a UV chamber for activating the film, the UV chamber having
        an inlet through which unactivated film enters the UV chamber;
        a plurality of UV lamps arranged in a series and disposed in the UV chamber, the series of UV lamps having first and second sides through which UV light is transmittable;
        a plurality of guide rolls disposed in said UV chamber and defining a film pathway for directing the film in close proximity with the first and second sides of the series of UV lamps so that the oxygen scavenging composition is activated by being exposed to UV light;
        a moveable UV shade that is capable of wrapping about the first and second sides, the UV shade being configured to control the dosage of UV light to which the film is exposed by adjusting the degree to which the UV shade is open;
        a shade drive system operable to move the UV shade between varying degrees of openness;
        an exit through which activated film may exit the UV chamber;
    a drive roll for driving the film along the film pathway through the UV chamber; and
    a control unit that is operatively connected to the shade drive system and the drive roll, the control unit being configured to instruct movement of the UV shade so that the dosage of UV light to which the film is exposed is controlled by adjusting the degree to which the UV shade is open and by adjusting the speed of the film as it travels through the UV chamber.

16. The system according to claim 15, wherein the control unit is operable to move the UV shade at a speed approximating a rate of speed at which the film is traveling through the UV chamber.

17. The system according to claim 15, wherein the control unit is configured to move the UV shade into a substantially closed position when forward movement of the film has stopped.

18. The system according to claim 15, further comprising an inventory system for storing activated film, the inventory system having an inventory shuttle that can move between a high capacity state and a low capacity state.

19. The system according to claim 18, wherein the inventory system is operatively connected to the control unit, the control unit being configured to perform at least one of the following in response to a predetermined event:
    stop intake of unactivated film into the UV chamber;
    instruct the UV shade to move into a closed position; and
    direct the inventory system to uptake and store any activated film disposed in the UV chamber.

20. The system according to claim 19, wherein the predetermined event is an interruption of a packaging operation employing the activated film.

21. The system according to claim 20, wherein the UV lamp shade is moved into a closed position at substantially the same time that substantially all of the activated film has exited the UV chamber.

22. The system according to claim 15, wherein the UV shade is configured to move from the open to the closed position in a path that substantially parallels the film pathway about the first and second sides of the bank of UV lamps, and wherein the rate at which the UV shade is moved into the closed position approximates a speed at which the film is traveling through the UV chamber.

23. A method of controlling the UV dosage to which a film having an oxygen scavenging composition is exposed, the method comprising:
   providing a film having an unactivated oxygen scavenging composition;
   passing the film through a UV chamber, wherein the UV chamber includes a UV light source and a moveable UV shade that is capable of being at least partially disposed between the UV light source and the film;
   exposing the film to the UV light source for a sufficient amount of time to activate the oxygen scavenger;
   controlling the dosage of UV light to which the film is exposed by adjusting the degree to which the shade is disposed between the UV light source and the film; and
   supplying the activated film to a packaging system.

24. The method according to claim 23, further comprising the step of adjusting a speed at which the film is traveling to thereby control the dosage of UV light to which the film is exposed.

25. The method according to claim 23, further comprising the step of moving the UV shade into a closed position in response to a predetermined event so that the UV shade substantially prevents UV light from the UV light source from contacting the unactivated film.

26. The method according to claim 25, further comprising the step of adjusting a rate at which the UV shade is moved into a closed position so the rate approximates a speed at which the film is traveling.

27. The method according to claim 23, further comprising the step of moving the UV shade into a closed position in response to a stoppage of the forward travel of the film.

28. The method according to claim 23, further comprising the steps of:
   detecting a stoppage of forward travel of the film at some point downstream of the UV chamber;
   moving the UV shade so that it is positioned between unactivated film entering the UV chamber and the UV light source so that UV light is substantially prevented from activating the unactivated film;
   driving activated film and film in the process of being activated out of the UV chamber and into an inventory system;
   drawing the UV shade closed at a rate that approximates a speed at which the film is traveling so that film in the process of being activated is activated before exiting the UV chamber;
   positioning the UV shade in a substantially closed position; and
   stopping forward travel of the film in the UV chamber when substantially all the activated film has exited the UV chamber.

* * * * *